Oct. 23, 1928.
E. R. BURTNETT
1,688,610
INTERNAL COMBUSTION ENGINE
Filed March 24, 1926
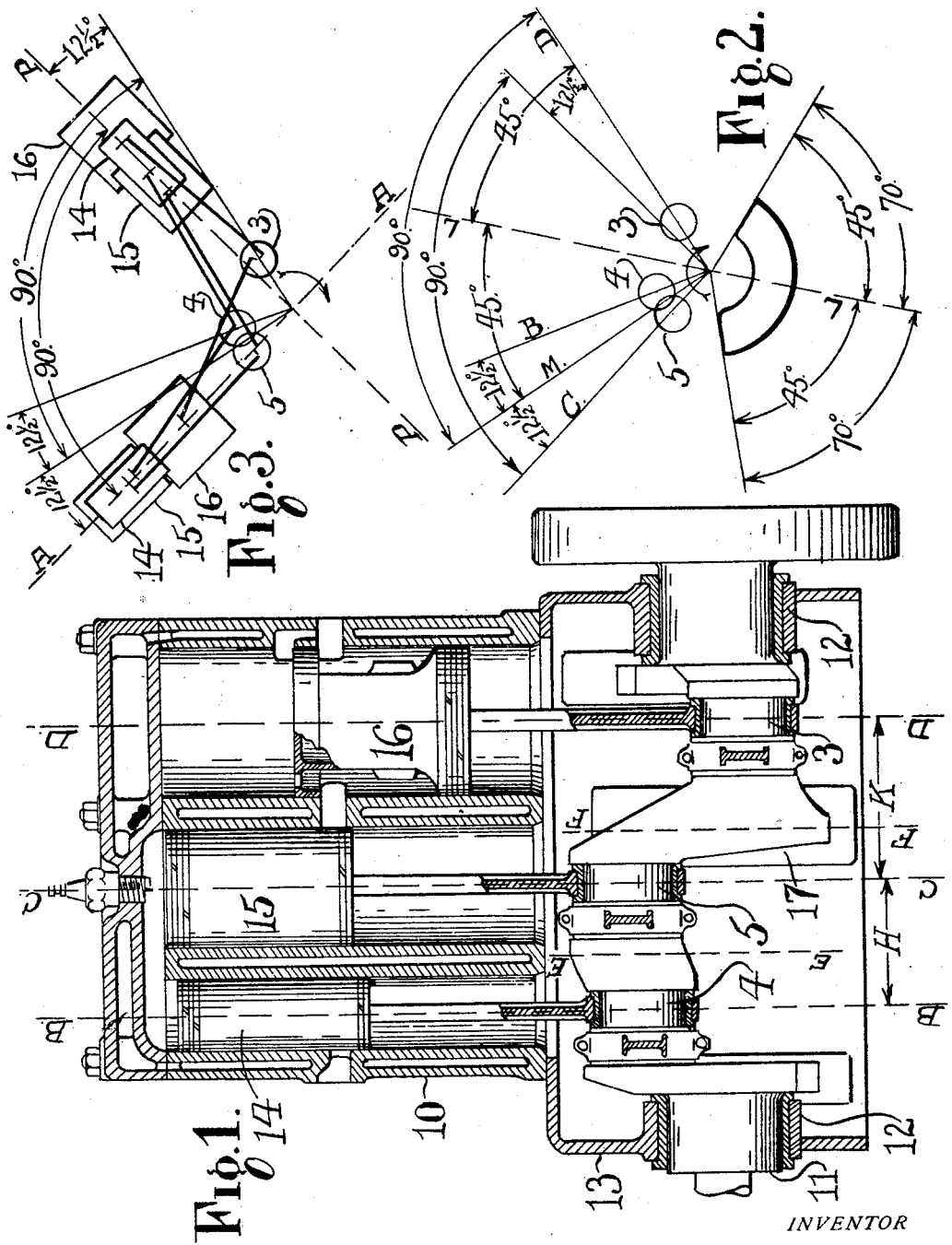
INVENTOR
Everett R. Burtnett Patented Oct. 23, 1928.

1,688,610

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION.

INTERNAL-COMBUSTION ENGINE.

Application filed March 24, 1926. Serial No. 96,968.

My invention relates to internal combustion engines and especially to a method of balancing, the principal object of my invention being to provide in a pair of three cylinder two stroke cycle charge pump and combustion units of V cylinder arrangement, a combination of reciprocative forces and crank pin spacing which will permit the counter balancing by weight applied to the crankshaft of the entire reciprocative force transmitted to the crank shaft and developed about the axes of the crank pins.

In a two stroke cycle engine a charge pump must be used in any case, also means must be provided to admit the fresh charge into the combustion chamber at the desired time, means must be provided for scavenging the combustion chamber of the spent products of combustion and if a two cycle engine is to be provided, which will develop a peak power at high revolution, a mechanically actuated port valve function for the transfer of the charge into the combustion chamber from the pump must also be provided, the effectiveness of this function will be increased if a charge pump is arranged adjacent to the combustion cylinder, the charge pump having a separate piston and a separate crank pin being provided of the crankshaft for the piston of the charge pump.

It has been found of advantage, to arrange the crank pin of a charge pump in advance of the crank pins of the dual pistons of the combustion chamber to obtain supercharging. Two cylinders joined as one combustion chamber by a common compression clearance space has met with considerable success in providing an improvement in two stroke cycle internal combustion engine, the practice being, to form exhaust ports in the wall of one of the two cylinders and fresh charge transfer ports in the wall of the other of the two cylinders, the pistons within the two cylinders of one dual cylinder combustion chamber providing the valvular function to the respective ports.

I have found in practice that to advance one combustion piston over the other in stroke movement, permits a better exhaust and transfer port timing, also if the advance combustion piston is made of less stroke piston sweep displacement, the compression peak can be extended to the moment the late stroke moving combustion piston reaches the position of head end dead center, in other words, by the proper ratio of crank lead and piston stroke sweep displacement, between the two pistons of commonly joined combustion cylinders, the late moving combustion piston can be made to be the controlling factor in compression and expansion of the contents of the dual cylinder combustion chamber, from such an arrangement a very satisfactory combination results, providing early exhaust port cut off, an out of center crank, the moment initial combustion takes place, increasing torque at low engine speeds, late transfer opening, providing the desired time period between the opening of the exhaust ports and the opening of the transfer ports and permitting the crank pin to which the charge pump piston is connected to be in advance 90° of the crank pins to which the two pistons of the adjacent dual cylinder combustion chamber are connected, this arrangement provides a very desirable functional relationship.

Those familiar with the art of internal combustion engine design and especially those who have interested themselves in the ways of balancing the reciprocative forces in high speed engines, are familiar with the principle of arranging the reciprocative forces in two-V disposed planes and the spacing of the two planes relatively 90° apart, with the two planes intersecting the axes of the crank shaft, and of the arrangement whereby two adjacent reciprocative forces of the same plane are separately attached to two crank pins of the crankshaft which are disposed relatively 90° apart, the like pair of adjacent reciprocative forces of the other plane which develops reciprocatory influence at right angles to the first plane are also attached to the two 90° spaced crank pins, if the reciprocative forces are of the same weight, stroke and friction, there will be substantially a uniform reciprocative force weight developed about the axes of the pair of 90° spaced crank pins and since the centrifugal force about the axis of the crankshaft resulting from the rotary mass is uniform, then a weight of the same total moments inches weight may be applied to the crank shaft as a counter, to the total out of balance weight developed off center of the axis of the crank shaft, the axis of the counter weight necessarily being disposed diametrically opposite the mean axis between the points of which the reciprocatory and rotary mass forces are concentrated, thus I have explained the modern conventional practice in V structures.

In my two stroke cycle engine structure, wherein a pair of pistons or reciprocative forces are arranged to one combustion chamber and one piston of an adjacent charge pump cylinder are arranged in one reciprocative plane and another pair of pistons or reciprocative forces are arranged to a second single combustion chamber with one piston of an adjacent charge pump cylinder arranged in duplicate in a second reciprocative plane and the two reciprocative planes are disposed relatively 90° apart, with the two V formed planes intersecting the axis of the crank shaft, I have three reciprocative forces in each plane, instead of two, I have three crank pins instead of two and I desire to divide the three reciprocatory and rotary mass forces about two centers, the axes of which are also 90° as is the axes of the pair of crank pins of the conventional practice.

Therefore, it is the object of my invention to provide a pair of combustion pistons and a charge pump piston, the stroke axes of the three pistons intersecting the axis of the crank shaft, to provide a pair of the said dual combustion and pump pistons, to arrange the pair of three piston into two rows, or two reciprocative planes, the two reciprocative planes being 90° apart with each of the reciprocative planes intersecting the axis of the crank shaft, to form the crank shaft of three crank pins, two reciprocative members being attached to each of the three crank pins, one reciprocative member of each of the two reciprocative planes, from a given end of the crank shaft and given end of the reciprocative planes, I purpose to arrange the first reciprocative member of each reciprocative plane of least piston sweep stroke displacement, the second reciprocative member from the given end of each reciprocative plane of intermediate piston stroke sweep displacement and the third reciprocative member from the given end of each reciprocative plane of greatest piston stroke sweep displacement.

Further, I purpose to arrange the relative positions of the three crank pins of the crank shaft so that the first crank pin from the given end to which the pistons of the radially disposed pair of least stroke sweep displacement are connected in advance of the second crank pin from the given end to which the pistons of intermediate stroke sweep displacement of the radially disposed pair are connected, for example 25° and the third crank pin from the given end in advance of the said first and second crank pins from the given end 90° of the mean axis between the two axes of the said first two crank pins. I further purpose that the weight of the reciprocative mass attached to the said third crank pin which is 90° in advance of the mean of the pair of crank pins first and second from the given end be of exactly the same weight as is the total weight of the reciprocative mass attached to both the first and second crank pins from the given end.

Further I propose that a counter weight be formed to the crank shaft diametrically opposite the mean axis which is taken centrally between the mean center of the pair of crank pins first and second from the given end and the crank pin which is third from the given end, this counter weight to be of equal total moments inches weight as developed at and concentrated about the three crank pin axes, counter weights may be formed at any desired place about the axis of the crank-shaft as may be found suitable to counter balance against rotary mass as near as possible in the same plane, but I wish to lay stress upon the necessity of the primary counter weight designed as a counter balance weight to the reciprocative forces transmitted to the three crank pins of the crank shaft relatively spaced for a purpose as described.

The said counter weight formed as a counter balance weight to the reciprocative forces should be in a position, the axis of the weight of the said counter weight with respect to its position relative to the axis of the crank shaft, should be exactly central between the mean axis of the mean of the reciprocative weight of the pair of reciprocative masses, which are arranged as the first and second reciprocative members from a given end and the axis of the reciprocative weight of the third reciprocative member which is arranged as the third reciprocative member from a given end.

In this manner it will be seen that I have provided a method of dividing in a 90° V arrangement of six reciprocative members formed into two reciprocative planes with three reciprocative masses in each plane, the reciprocative forces thereof into two mean centers to which I diametrically dispose the counter weight.

With the foregoing and other objects in view my invention consists in certain novel features of arrangement of parts to balance the forces developed by the movement of the parts that will be hereinafter more fully described and claimed and illustrated in the accompanying drawings.

Fig. 1 is a longitudinal section taken through the center of one three cylinder unit of my improved balanced 90° V arranged pair of triple reciprocative forces.

Fig. 2 is a diagrammatic view that graphically illustrates the relative positions of the three crank pins and the relative position of the counter balance weight with respect to the three crank pins as taken endwise of the crank shaft from the end as shown in Fig. 1 without a wheel and the clockwise rotative movement being indicated by the arrow.

Fig. 3 is a diagrammatic view that graphically illustrates the relative positions of the three crank pins of the crank shaft, the position of the counter balance weight relative to the position of the three crank pins and the two sets of three reciprocative members arranged in two 90° spaced reciprocative planes.

Referring by numerals to the accompanying drawings, "10" designates a cylinder block in which are formed three cylinders; two of these three cylinder units are relatively spaced 90° apart in V formation with the axes of the three cylinders comprising each row of three cylinders intersecting the axis of a crank shaft "11", the crankshaft is journalled in main bearings "12", which are suspended in a crank case "13", within the three cylinders of each unit of the V structure are arranged the six reciprocative members "14", "15", "16", numerically in duplicate in each of the two V arranged units, the reciprocative members "14" of each wing are the pistons of least stroke sweep displacement, the reciprocative members "15" of each wing are the pistons of intermediate stroke sweep displacement, the reciprocative members "16" of each wing are the pistons of greatest stroke sweep displacement.

There are three crank pins "3", "4" and "5" of the crank shaft "11" for each V structure of six reciprocative members, the crank pin "3" being the crank pin in advance rotatively with respect to the direction of rotation of the crankshaft, the pistons of greatest stroke sweep displacement and of greatest weight are separately attached to the said advance crank pin "3"; in two cycle engine practice this is the piston and crank pin I adopt to the function of charge pumping. The crank pin "4" is the second crank pin rotatively in order relative to the three crank pins, to this crank pin the pistons of least stroke sweep displacement are connected; in two cycle engine practice this is the piston and crank pin I adapt to the function of advance combustion and exhaust port operation. The crank pin "5" is the third and last crank pin of the three crank pins rotatively with respect to the position of the three crank pins; to this crank pin I attach the pistons of intermediate stroke sweep displacement which are separately connected. In two cycle engine practice I adapt this piston and crank pin to the second combustion piston duty and transfer port operation function.

A counter balance weight "17" is arranged with the axis of its weight disposed diametrically opposite the mean axis of weight transmitted to and concentrated about the axes of the three crank pins "3", "4" and "5", developed by the respectively singularly alternating inertia forces of the six reciprocative members.

Assuming for example that the crank pin "4" is 25° in advance rotatively of the crank pin "5", the crank pin "3" would be in a position relatively rotatively 77½° in advance of the crank pin "4" and 102½° in advance of the crank pin "5", or exactly 90° in advance relatively rotatively of the mean center between the axes of the crank pins "4" and "5", referring to Fig. 2 the mean center between the crank pins "4" and "5" is designated by the line M, the axis of the crank pin "4" designated by the line B, the axis of the crank pin "5" being designated by the line C, the axis of the crank pin "3" being designated by the line D, and the axis of the counter balance weight "17" being designated by the line L—L, the line D being 90° in advance of the line M, the line B being 25° in advance of the line C, the line M being 12½° in advance of line C and 12½° retarded of line B and the line L—L passing centrally between the lines M and D and diametrically opposite the mean between the lines M and D, thus I have explained the positions of the three crank pins and the reciprocative force counter balance weight radially with respect to the axis of the crank shaft.

To prevent a rocking couple the reciprocative force counter balance weight must be arranged with the axis of its weight relative to the axis of the crank shaft lengthwise centrally between the mean center between the crank pins "4" and "5" and the center of the crank pin "3", referring to Fig. 1 this is illustrated by the line F indicating the axis of the counter weight with respect to the axis of the crank shaft lengthwise, line D designates the center of the crank pin "5", line B designates the center of the crank pin "4", line C designates the center of the crank pin "5" and line E designates the mean center between the centers of the crank pins "4" and "5". H represents a given distance between line C and line B, and K represents a given distance between line D and line C, being the same distance as the distance represented by H.

Referring to Fig. 3, the three reciprocative members "14," "15" and "16" of one of the two 90° spaced cylinder blocks are centered for reciprocatory movement with each reciprocative member axially centered on line A—A which intersects the axis of the crank shaft, the three reciprocative members "14," "15" and "16" of the other of the two 90° spaced cylinder blocks are centered for reciprocatory movement with each reciprocative member axially centered on line P. P. which also intersects the axis of the crank shaft.

It will be understood that minor changes in the size, form and construction of the various parts of my improved engine may be made and substituted for those herein shown and described without departing from the spirit of the invention, the scope of which is set forth in the appended claims.

I claim as my invention:

1. In an internal combustion engine, a rotary and reciprocative inertia forced balanced unit comprising six cylinders arranged in two rows of V-formation, three cylinders in each row, the three cylinders having chambers of different diameters, the head ends of the two smaller chambers in each row being connected to form a dual combustion chamber, pistons arranged for operation within the six cylinders, a crankshaft having three separate throws, the pistons in the corresponding cylinders of the two rows being separately connected to the three crank throws, the three crank throws of the crankshaft occupying different radial positions, said three crank throws being arranged on one side of the axis of the crankshaft and a counter-balancing weight carried by the crankshaft and disposed on the opposite side of the axis thereof from said three crank throws.

2. In an internal combustion engine, a power unit comprising three cylinders having chambers of different piston sweep displacement, two of said cylinders functioning as combustion cylinders, the third cylinder functioning as a charge pumping cylinder, pistons arranged for operation within said three cylinders, a crankshaft having three crank throws all arranged on one side of the axis of the crankshaft, said three crank throws occupying different radial positions and a counter-balancing weight carried by said crankshaft and disposed on the opposite side of the axis of said crankshaft from said three cranks, the mean axis of the weight of said counter-balancing weight being equal to and diametrically opposite to the mean radial center of the three cranks.

In testimony whereof, I hereto affix my signature.

EVERETT R. BURTNETT.